United States Patent [19]  
Kalopissis et al.

[11] 3,917,815  
[45] Nov. 4, 1975

[54] COSMETIC COMPOSITIONS CONTAINING N-OXYPYRIDYL DERIVATIVES

[75] Inventors: Gregoire Kalopissis, Paris; Claude Bouillon, Eaubonne, both of France

[73] Assignee: L'Oreal, Paris, France

[22] Filed: Apr. 5, 1974

[21] Appl. No.: 458,444

Related U.S. Application Data

[63] Continuation-in-part of Ser. No. 69,936, Sept. 4, 1970, abandoned.

[30] Foreign Application Priority Data

Sept. 4, 1969 Luxembourg............................ 59405  
Feb. 20, 1970 Luxembourg............................ 60384  
Sept. 4, 1970 Australia............................. 19609/70  
Sept. 4, 1970 United Kingdom................ 42608/70  
Sept. 3, 1970 Spain .................................. 383354  
Sept. 3, 1970 Canada ................................. 92484  
Sept. 3, 1970 Sweden.............................. 12008/70

[52] U.S. Cl. ...................... 424/45; 8/10.1; 252/106; 260/270 R; 260/294.8 F; 260/294.8 G; 424/DIG. 1; 424/DIG. 2; 424/DIG. 4; 424/DIG. 5; 424/46; 424/47; 424/63; 424/65; 424/67; 424/68; 424/70; 424/71; 424/72; 424/232; 424/245; 424/263; 424/365

[51] Int. Cl.$^2$.. A61K 7/06; A61K 7/36; A61K 7/38; A61K 31/44

[58] Field of Search .. 260/294.8 F, 294.8 G, 270 R; 424/45, 46, 47, DIG. 4, 232, 245, 263, 65, 67, 68

[56] References Cited  
UNITED STATES PATENTS  
3,531,490 9/1970 Friedman et al............. 260/294.8 G OTHER PUBLICATIONS  
Tortorella et al., Chemical Communications, No. 7, (1967), pp. 321–323.

Primary Examiner—Albert T. Meyers  
Assistant Examiner—Vera C. Clarke  
Attorney, Agent, or Firm—Cushman, Darby & Cushman

[57] ABSTRACT

N-oxypyridyl derivative selected from the group consisting of a. a compound of the formula

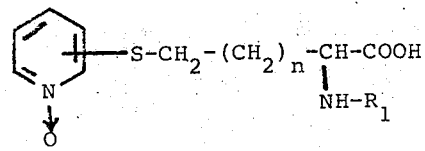

wherein $n$ is equal to 0 or 1, the sulfur atom being attached to the N-oxypyridyl nucleus in a position ortho or para to the NO group, and $R_1$ represents hydrogen, —$COR_2$ or —$SO_2R_2$ wherein $R_2$ is alkyl having 1–4 carbon atoms, phenyl or tolyl;

b. the metal complex of the compound in (a) when $R_1$ is hydrogen; and c. the metal salt of the compound in (a) when $R_1$ is —$COR_2$ or —$SO_2R_2$.

These derivatives are usefully employed in compositions for application to the hair, scalp or skin in order to combat the greasy and unaesthetic appearance of the hair and scalp and to counteract the formation of body odours of skin. The composition includes the said derivative of pyridine together with an appropriate carrier including, for instance, water, lower alkanol, an aqueous solution of a lower alkanol, a detergent and a cosmetic powder. The said derivative of pyridine can be included in such compositions in amounts ranging from about 0.01–10 percent by weight thereof.

9 Claims, No Drawings

COSMETIC COMPOSITIONS CONTAINING N-OXYPYRIDYL DERIVATIVES

This application is a continuation-in-part of our application Ser. No. 69,936 filed Sept. 4, 1970, now abandoned.

The present invention relates to novel pyridine derivative compounds, to a process for preparing them and to cosmetic and deodorant compositions containing them.

The compounds of this invention have fungicidal, bactericidal and anti-dandruff characteristics and are usefully employed as an active compound in cosmetic and deodorant compositions. The active compounds of the present invention are derived from cysteine or a derivative thereof wherein the hydrogen of the thiol function of cysteine is replaced by an N-oxypyridyl radical.

The cosmetic compositions of the present invention when administered topically to a human being having hair, scalp or skin characterized by a greasy and unaesthetic appearance significantly improve the condition and appearance of the hair, scalp and skin by essentially eliminating this greasy and unaesthetic appearance. This condition of a greasy and unaesthetic appearance of the hair, scalp and skin can be occasioned by excessive secretions of the sebaceous glands and the compositions of this invention are useful in diminishing such excessive secretions.

There has already been proposed for use in combatting against the greasy appearance of the hair as well as against the unaesthetic appearance of the skin certain S-substituted derivatives of cysteine and its homologs. However, it has been found that the active compounds according to the present invention exhibit an activity greater tthan that of previously known compounds for combatting against a greasy and unaesthetic appearance of the hair, scalp and skin.

The deodorant compositions of the present invention when applied topically to a human being having dampness of the skin and body odours due to decomposition of the perspiration by the micro-organisms present, significantly counteract the formation of body odours by essentially inhibiting the micro-organism action.

This condition of dampness of the skin and body odours can be occasioned by normal or excessive secretions of the sudoriferous glands. The deodorant compositions of this invention are very useful to combat body odours due to the anti-microbial activity of the active compounds.

Accordingly, the present invention has for an object novel compounds of the formula

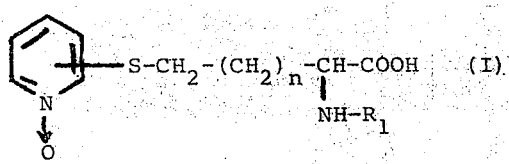

wherein $n$ is equal to 0 or 1, the sulfur atom being attached to the N-oxypyridyl nucleus in a position ortho or para to the NO group, and $R_1$ represents a member selected from the group consisting of hydrogen, $COR_2$ and $SO_2R_2$ wherein $R_2$ represents a member selected from the group consisting of alkyl having 1 to 4 carbon atoms, phenyl and tolyl.

When $R_1$ is hydrogen the novel compounds of this invention can also be in the form of their metal complexes, or chelates, and suitably such metals used to form the chelates are selected from the group consisting of zinc, iron (Fe II), cadmium and manganese.

These chelates have the formula:

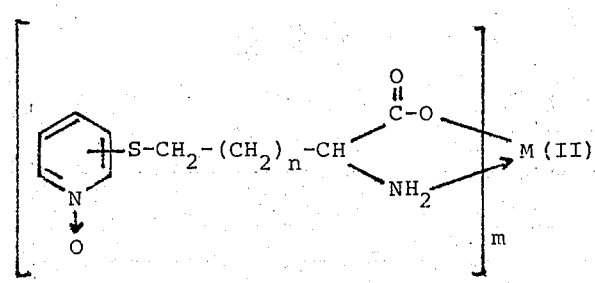

wherein:

$n$ is equal to 0 or 1, M represents a metal selected from the group consisting of zinc, iron (Fe II), cadmium and manganese and $m$ is an integer corresponding to the valence of the metal M.

Advantageously these chelates can have the formula

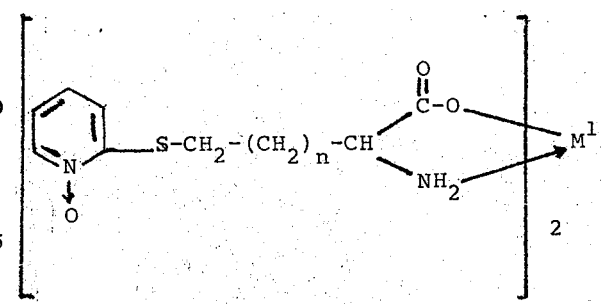

wherein $n$ is equal to 0 or 1 and $M^1$ is selected from the group consisting of zinc, iron, cadmium and manganese.

When $R_1$ is $COR_2$ or $SO_2R_2$, the novel compounds of this invention can also be in the form of their metal salts, and suitably such metals used to form these salts are selected from the group consisting of zinc, iron, manganese, tin, cadmium, titanium, aluminium, molybdenum, sodium, potassium, calcium, barium and lithium.

These salts have the formula

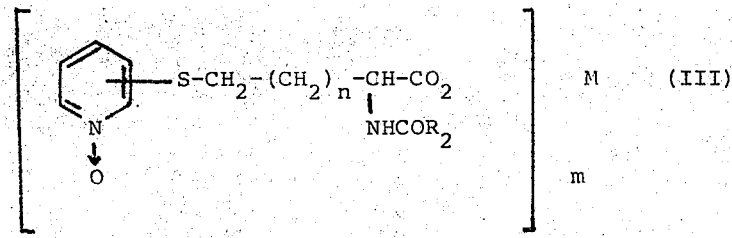

or

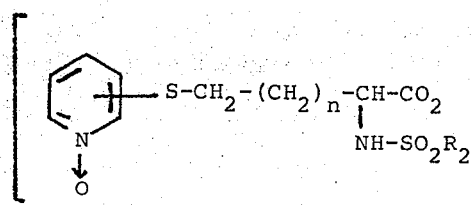

wherein $R_2$ has the meaning given above, $n$ is equal to 0 or 1, M is selected from the group consisting of zinc, iron, manganese, tin, cadmium, titanium, aluminium, molybdenum, sodium, potassium, calcium, barium and lithium and $m$ is an integer corresponding to the valence of the metal M.

Advantageously, these salts can have the formula

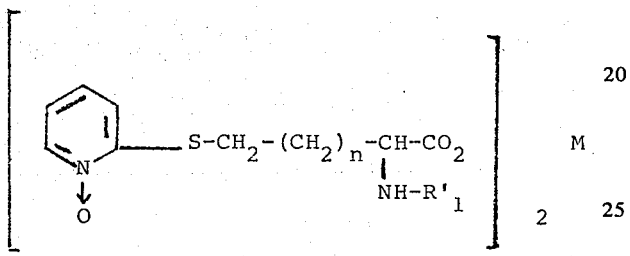

wherein $n$ is equal to 0 or 1, $R'_1$ is selected from the group consisting of —$COR'_2$ and —$SO_2R''_2$ wherein $R'_2$ is selected from the group consisting of alkyl having 1–4 carbon atoms and phenyl, and $R''_2$ is selected from the group consisting of alkyl having 1–4 carbon atoms, phenyl and tolyl; and M is selected from the group consisting of iron and zinc.

The present invention is also directed to the salts of the esters of the compounds of formula (I), said salts having the formula:

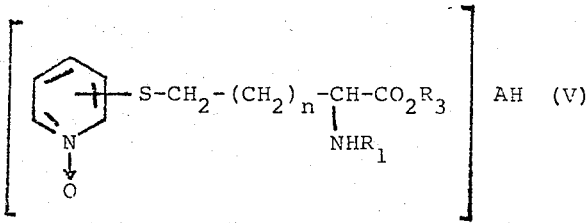

wherein $n$ is equal to 0 or 1, $R_1$ is selected from the group consisting of hydrogen, $COR_2$ and $SO_2R_2$ wherein $R_2$ is selected from the group consisting of alkyl having 1 to 4 carbon atoms, phenyl and tolyl, $R_3$ represents alkyl having 1 to 4 carbon atoms, and AH is an acid selected from the group consisting of hydrochloric acid, salicylic acid, malic acid, tartaric acid and maleic acid.

Advantageously, these ester salts include those of the formula

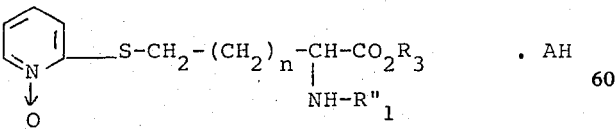

wherein $n$ is equal to 0 or 1, $R_3$ is alkyl having 1–4 carbon atoms and $R''_1$ is selected from the group consisting of hydrogen and —$COR_2$ wherein $R_2$ is alkyl having 1–4 carbon atoms and AH is an acid selected from the group consisting of hydrochloric acid, salicylic acid, malic acid, tartaric acid and maleic acid.

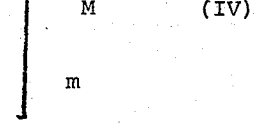

Specific novel compounds of the present invention usefully employed in cosmetic compositions are:

a. S-(N-oxypyridyl-2) L-cysteine having the formula:

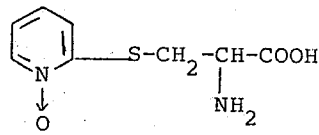

b. S-(N-oxypyridyl-2) homocysteine having the formula:

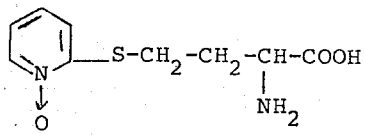

c. The dihydrochloride of the methyl ester of S-(N-oxypyridyl-2) homocysteine having the formula:

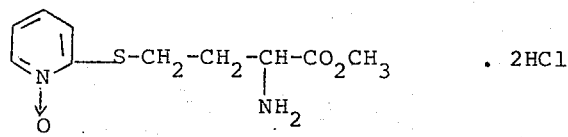

Similarly, the ethyl, propyl, isopropyl and butyl esters are also usefully employed.

d. The dihydrochloride of the methyl ester of S-(N-oxypyridyl-2) L-cysteine having the formula:

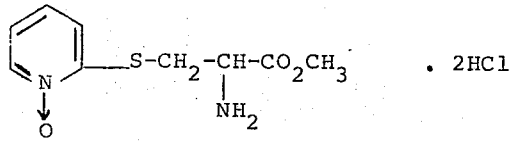

e. Salicylate of the ethyl ester of S-(N-oxypyridyl-2) L-cysteine

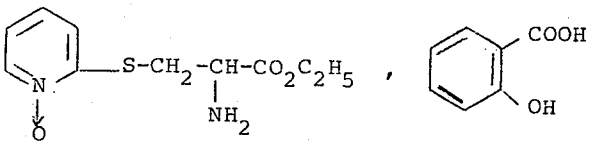

f. Tartarate of the ethyl ester of S-(N-oxypyridyl-2) L-cysteine

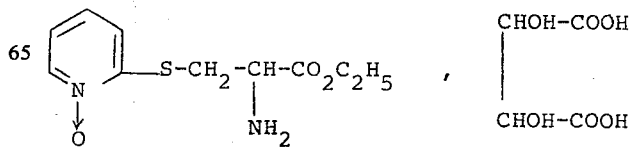

Additionally, the methyl, propyl, isopropyl and butyl esters are also employed.

g. S-(N-oxypyridyl-2)-N-acetyl L-cysteine having the formula:

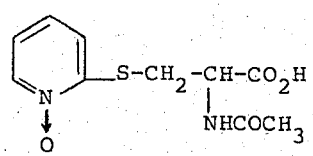

h. The zinc salt of S-(N-oxypyridyl-2)-N-acetyl-L-cysteine having the formula:

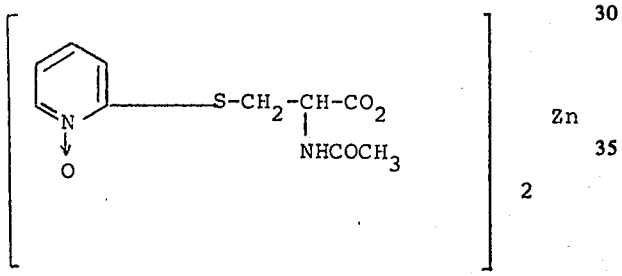

Additionally, corresponding iron, manganese, tin, cadmium, titanium, aluminium, molybdenum, sodium, potassium, calcium, barium and lithium salts are also usefully employed.

i. The zinc chelate of S-(N-oxypyridyl-2) L-cysteine having the formula:

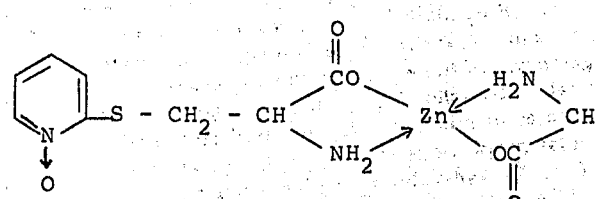

j. The zinc chelate chelate of S-(N-oxypyridyl-2) homocysteine having the formula:

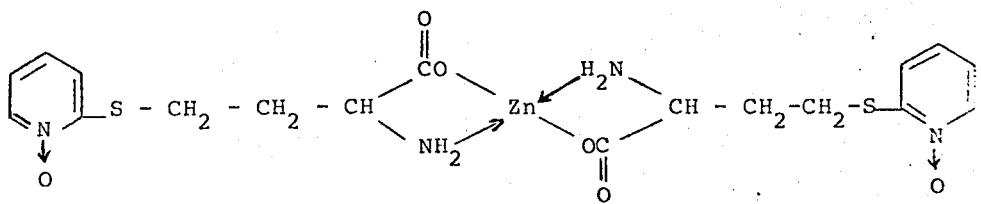

k. The iron chelate of S-(N-oxypyridyl-2) L-cysteine having the formula:

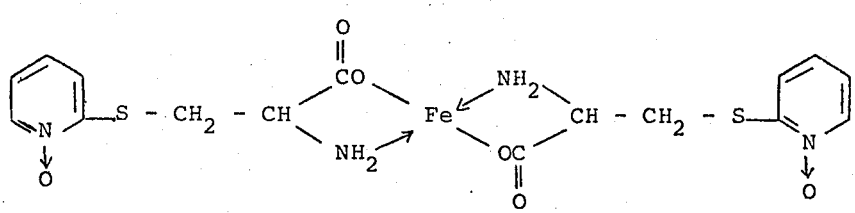

l. The cadmium chelate of S-(N-oxypyridyl-2) L-cysteine having the formula:

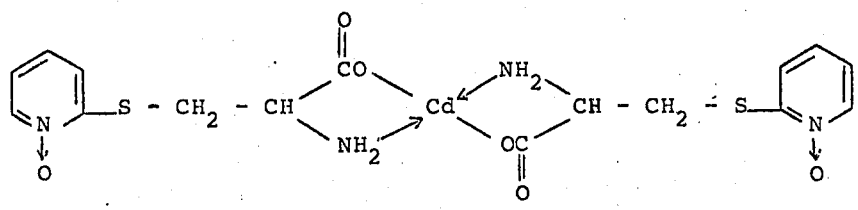

and m. The manganese chelate of S-(N-oxypyridyl-2) L-cysteine having the formula:

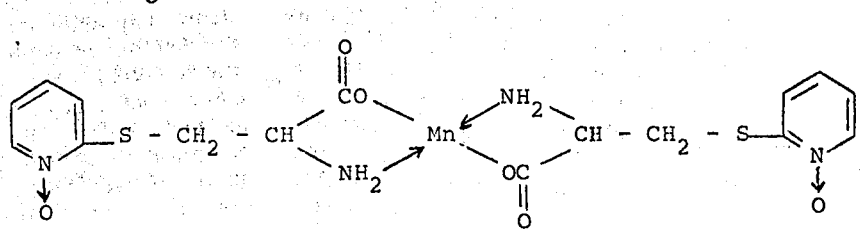

Additionally, the following compounds are also employed:

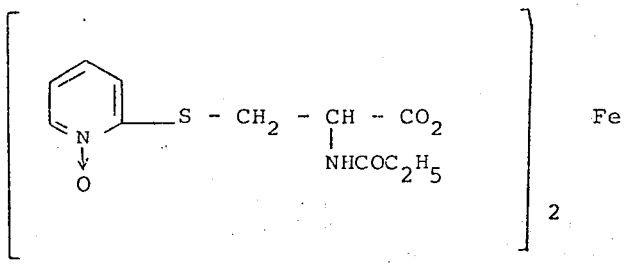

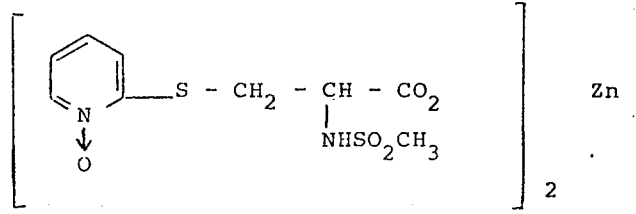

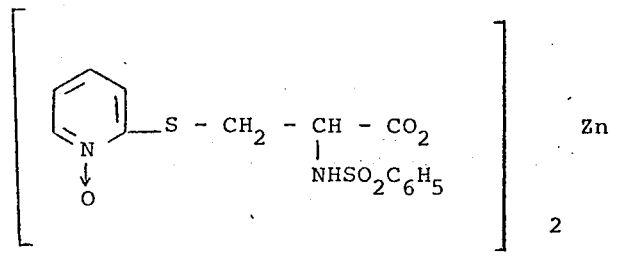

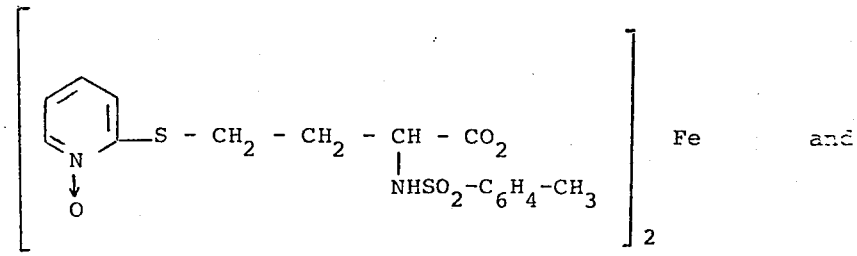

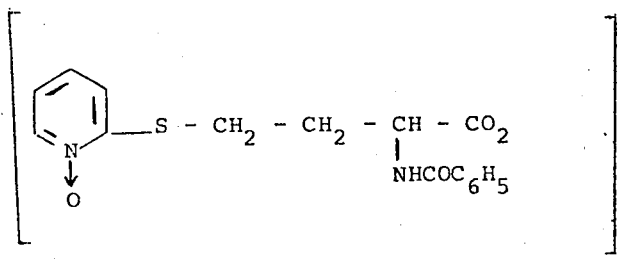

Corresponding salts of other metals such as manganese, tin, cadmium, titanium, sodium, calcium and barium are also usefully employed.

The present invention is also directed to a process of preparing the compounds of formula I. This process comprises reacting a halogen derivative (preferably, the bromide or chloride) of pyridine N-oxide with cysteine or with a thiol homolog of cysteine, the reaction being performed in a polar solvent medium selected from the group consisting of water and dilute aqueous lower alkanol solution 20–50% by volume, said medium having a pH ranging from about 7–10 and at a temperature of at least about 10°C, preferably at least 20°C and less than about 80°C. The pH value is obtained by adding a mineral or organic base such as NaOH, KOH, NH$_4$OH, diethylamine or triethylamine, organic bases being prefered. The molar ratio of said halogen derivative of pyridine N-oxide to said cysteine or cysteine thiol homolog is about 1–1.5:1.

The preparation of the metal salts and complexes is achieved by addition to the reaction medium containing said N-oxypyridyl derivative, an inorganic or organic salt of the metal which it is desired to make into a salt or complex. Preferably, metal acetates, metal carbonates or metal sulfates are used in essentially equimolar proportions relative to the molar concentration of the N-oxypyridyl derivative formed.

The present invention also has for an object a cosmetic composition having fungicidal, bactericidal and anti-dandruff characteristics for application to the hair, scalp or skin in order to combat the greasy and unaesthetic appearance of the hair and scalp and to counteract the formation of body odours, said composition comprising a solution in a carrier selected from the group consisting of water, a lower alkanol selected from the group consisting of ethanol and isopropanol and an aqueous solution of said lower alkanol wherein said lower alkanol is present in amounts of about 20–70 percent by weight of said solution, of at least one pyridine derivative as defined above, in amounts of about 0.01–10 percent by weight of said composition.

The present invention also has for an object a pressurized sprayable aerosol cosmetic composition having fungicidal, bactericidal and antidandruff characteristics for application to the hair, scalp and skin in order to combat the greasy and unaesthetic appearance of the hair and scalp and to counteract the formation of body odours, said composition comprising in admixture with a member selected from the group consisting of water, ethanol, isopropanol, talcum powder and propylene glycol, at least one pyridine derivative as defined above, in amounts of about 0.01–10 percent by weight of said composition.

Yet a further object of the present invention is a cosmetic composition in the form of a hair setting lacquer or lotion containing at least one pyridine derivative as defined above in an appropriate cosmetic vehicle or carrier, with at least one conventional cosmetic film forming resin, generally having a molecular weight ranging from about 10,000–700,000, the said pyridine derivative being present in amounts of about 0.5 to 6 percent by weight of said composition and said film forming resin being present in amounts of about 1–20 percent by weight of said composition.

Among the usable cosmetic resins according to the invention there can be mentioned: polyvinylpyrrolidone having a molecular weight ranging, for instance, between 10,000 and 700,000; copolymer of polyvinylpyrrolidone/vinyl acetate (70%–30%:30%–70% — K in 1% ethanol = 25–30); copolymer of vinyl acetate and an unsaturated carboxylic acid such as crotonic acid (90%/10%, MW = 20,000); copolymer resulting from the polymerization of vinyl acetate (75–85%), crotonic acid (5–15%) and an acrylic or methacrylic ester or an alkyl vinyl ether (5–15%); copolymer resulting from the copolymerization of vinyl acetate (63–88%), crotonic acid (5–15%) and a vinyl ester of a long carbon chain acid having 10–22 carbon atoms or even an allyl or methallyl ester of a long carbon chain acid having 10–22 carbon atoms (5–25%); and polymers resulting from the polymerization of at least one unsaturated ester and at least one unsaturated acid.

In a particular mode of operation, the cosmetic resins contained in the compositions according to the invention may have lateral or branch chains, at the end of which a thiol function is located.

The cosmetic vehicle or carrier employed in the hair setting lacquer or lotion of the present invention can be a lower alkanol selected from the group consisting of ethanol and isopropanol or an aqueous solution of a lower alkanol selected from the group consisting of ethanol and isopropanol wherein the lower alkanol is present in amounts of about 20–70 percent by weight of said solution. This alcoholic or hydroalcoholic solution of the active compound can also be admixed and packaged in an aerosol container with a conventional quantity of a liquefied propellant gas under pressure. For example, an aerosol hair lacquer can be provided by introducing 1–20 percent, preferably 1–5 percent, of a resin defined above in a mixture comprising ¼ to ⅓ by weight of a lower alkanol as defined above and ⅔ to ¾ by weight of a liquefied propellant gas under pressure. Conventional aerosol propellants such as fluorinated hydrocarbons including the FREONS can be employed. Representative of such propellants are dichlorodifluoromethane, trichloromonofluoromethane and mixtures thereof. Obviously, other well known propellants can also be used.

These hair setting lotions and lacquers can be employed by impregnating the hair with the same, rolling the hair up on rollers and drying the hair.

The cosmetic composition of the present invention can also be provided in the form of a composition to effect a permanent waving of the hair exhibiting a greasy or unaesthetic appearance due to an excessive secretion of the sebaceous glands.

As is known, the permanent deformation of hair can be achieved in one stage or two stages.

When the permanent deformation of the hair is achieved in two stages, the active compound of this invention can be present either in the reducing composition employed to effect the first stage, or in the oxidation or neutralization composition employed to effect the second stage of the permanent waving operation.

When the permanent deformation of the hair is achieved in a single stage, a self-neutralizing composition contains, in combination with the self-neutralizing agent, the active compound of this invention.

In accordance with the invention, the composition for effecting the first stage of a two-stage operation contains at least one compound for reducing the disulfide linkages of keratin, such as thioglycolic acid, ammonium thioglycolate, thioglycerol, thiolactic acid and thioglycolamide, in combination with at least one active compound of this invention as defined above, present in amounts of 0.1–20 weight percent, the pH of the composition being preferably between 3 and 9.5.

The second stage of the operation is carried out using a conventional oxidizing or neutralizing composition, not containing the active compound of this invention.

In another embodiment of the present invention, the first stage of the permanent wave operation can be carried out using a conventional reducing agent, followed by carrying out the second stage using a neutralizing or oxidizing agent containing composition also containing the active compound of this invention as defined above, present in amounts of about 0.5–20 percent by weight of the composition and preferably between 1–10 weight percent thereof. Suitable oxidizing agents include hydrogen peroxide, sodium or potassium bromate, and sodium or potassium percarbonate.

When the permanent deformation of the hair is achieved in a single step, the self-neutralizing composition contains, in combination, a thiol and an organic disulfide in a molar ratio of disulfide to thiol greater than 1, with the active compound of this invention being present in an amount between 0.1–20 percent, preferably between 0.5–10 percent, by weight of said composition.

The present invention also has for an object the provision of a composition to effect the permanent deformation of hair such as described above, which composition is packaged in two parts.

According to this embodiment of the invention, one part can be constituted by a conventional reducing composition, while the other part can contain the active compound of this invention, or, alternatively, one part is constituted by a conventional neutralizing composition while the other part is constituted by the active compound of this invention.

The compositions of this invention employed to effect a permanent deformation of the hair can also contain conventional components for similar cosmetic compositions such as penetrating agents, surface active agents, dyes and perfumes.

The cosmetic vehicle or carrier useful for the production of these permanent waving compositions can be those generally employed for the production of permanent waving compositions such as water, lower alkanols such as ethanol and isopropanol and their mixtures, as defined above. Further, these compositions can be provided in the form of a solution, foam, cream or gel.

In a particular embodiment, the alcoholic or hydroalcoholic solution employed as the carrier in the permanent waving composition can also be used in combination with a conventional quantity of liquefied propellant gas and be packaged under pressure in an aerosol container to provide a sprayable aerosol formulation.

The cosmetic composition of this invention can also take the form of a shampoo for application to the hair and scalp of a person having hair and a scalp characterized by a greasy and unaesthetic appearance due to excessive secretion of the sebaceous glands, to improve the condition and appearance thereof by diminishing said excessive secretion of the sebaceous glands, said composition containing, in combination, at least one anionic, cationic, nonionic or amphoteric detergent with at least one active compound of the present invention.

Representative anionic detergents include alkyl sulfates, alkylether sulfates, alkylpolyether sulfates and alkyl sulfonates, in which the alkyl moiety of each contains 8–18 carbon atoms, monoglyceride sulfates, alkanolamide sulfates, alkanol amide sulfones, soaps of fatty acids, monosulfosuccinates of fatty alcohols, the condensation product of a fatty acid with isethionic acid, the condensation product of fatty acids with methyl taurine, the condensation product of fatty acids with sarcosine and the condensation product of fatty acids with a protein hydrolyzate.

Representative cationic detergents include long chain quaternary ammoniums, esters of fatty acids and amino alcohols and polyether amines. Specifically, there can be used dilauryldimethyl ammonium chloride, diisobutyl phenoxyethoxy ethyl dimethylbenzyl ammonium chloride, cetyl trimethyl ammonium bromide, N-cetyl pyridinium bromide and benzethonium chloride, lauryl benzyl trimethyl ammonium bromide or chloride, myristyl benzyl trimethyl ammonium bromide or chloride and cetyl benzyl trimethyl ammonium bromide or chloride.

Representative nonionic detergents are the esters of polyols and sugars, the condensation product of ethylene oxide on fatty acids, on fatty alcohols, on long chain alkylphenols, on long chain mercaptans and on long chain amides, and polyethers of polyhydroxylated fatty alcohols. Specifically, there can be used lauryl alcohol oxyethylenated with 12 moles of ethylene oxide and $C_{12}$ thiols oxyethylenated with 12 moles of ethylene oxide.

Suitable amphoteric detergents include asparagine derivatives, the condensation product of monochloroacetic acid on imidazoles and alkylamino propionates. Specifically, there can be used lauryl aminopropionate of a radical derived from copra fatty acids; alkyl dimethyl betaine and compounds of the formula.

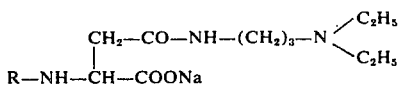

wherein R is equal to 2/3 copra ($C_6$–$C_{18}$ acids) and 1/3 tallow.

The shampoos according to the present invention generally contain from 4 to 55 %, and preferably from 5 to 30 % by weight of the detergent compound when the shampoo composition is in liquid form and when the carrier for the same is an aqueous medium, they contain about 0.5 to 10 %, and preferably 1 to 5 % by weight of the active component of this invention.

The shampoos according to the invention can also contain other conventional cosmetic ingredients, such as perfumes and hair dyes. They may also contain thickening agents such as the alkanolamides of fatty acids, cellulose derivatives (carboxymethylcellulose and hydroxymethylcellulose, for example), esters of long chain polyols, and natural gums so as to take the form of a cream or gel.

The shampoo according to this invention can also take the form of a powder adapted to be applied either to wet hair, or dissolved in a predetermined volume of water before washing the hair with the resulting solution. The shampoo composition, in powder form, comprises in admixture about 65 to 90 % and preferably 70 to 80 % by weight detergent, as defined above and 5 to 30 % by weight of the active component of this invention.

The shampoo compositons make it possible to combat against a greasy and unaesthetic appearance of the hair, as well as against dandruff by applying the composition of the hair, in amounts effective to impregnate the hair, massaging the scalp for a time in the order of a few minutes and rinsing the hair.

Usually, satisfactory results are obtained by shampooing once a week. This regimen provides a significant reduction, and in certain cases substantially complete elimination of the greasy appearance of the hair, while also providing normal care for the hair.

The present invention also has for an object the provision of a dermal lotion for application to human skin characterized by a greasy and unaesthetic appearance due to excessive secretion of the sebaceous glands, to improve the condition and appearance thereof by diminishing said excessive secretion of the sebaceous glands, said dermal lotion comprising in combination an appropriate cosmetic vehicle for application to the skin and the active compound of this invention. Such compositions can be provided in the form of a cream, milk, gel, dermatological cake or aerosol foam. They can also be provided as an aqueous solution or an aqueous solution of a lower alkanol as defined above. Such dermal lotions generally contain between 0.1–3 percent by weight of the active compound of the present invention. They can also contain any conventional component usually employed in facial beauty creams, such as fatty bodies, emulsifiers, preservatives, perfumes, dyes and waxes. They can also contain colored pigments which permit coloration of the skin and masking skin defects.

The deodorant compositions according to this invention as previously explained are intended to counteract the formation of body odours and they can be provided in many forms and, particularly, in the form of an aqueous, or hydroalcoholic lotions of a soap or of an aerosol spray which compositions contain preferably 0.1 to 3 percent by weight of at least one active component as defined above. By aerosol spray is understood mixtures made up of a conventional propellant, a lower alkanol, if desired, and an emollient.

The excellent anti-microbial activity of the active compounds have been tested against the following microorganisms: *staphylococcus epidermitis, staphylococ-* cus aureus, sarcina lutea, Bacillus Subtillis, micrococcus aureus, aspergillus niger, Penicillium Natatum, Mucor Mucedo, saccharomyces cerevisiae, Pityrosporum ovale.

For a better understanding of the invention, there will now be given by way of illustration examples of the preparation of the active compounds of the present invention and examples of compositions made in accordance with this invention.

PROCESS FOR THE PREPARATION OF THE COMPOUNDS OF THIS INVENTION

Example A

Preparation of S-(N-oxypyridyl-2) L-cysteine having the formula

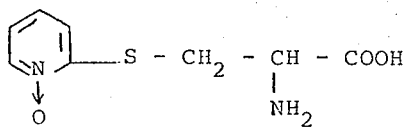

Into an aqueous solution containing 52.6 of bromo-2-pyridine-N-oxide hydrochloride, 39.6 g of L-cysteine hydrochloride and 200 cm3 of water there are slowly poured, while stirring said solution, 200 cm3 of 5N NaOH so as to maintain the pH of the solution between 8.5 and 9. The temperature of the mixture is kept at 50°C during addition of the NaOH and until the thiol groups disappear.

After cooling, the solution is contacted with a cation exchange resin (Dowex 50 in the acid or hydrogen form, having a mesh size of 100–200 mesh), which is then washed with water, and subsequently treated with a dilute ammonia solution, as an eluant, to free the product fixed on the resin. The residue obtained after evaporation of the eluate under a vacuum is crystallized in methanol.

There is obtained, with a weight yield of 81% a product in the form of white needles, which product is soluble in water and melts at 180°C with decomposition.

Elementary analysis gave the crude formula $C_8H_{10}N_2O_3S$ (M.W. = 214.2) and the following results:

|      | Calculated | Found |
|------|------------|-------|
| C%   | 44.81      | 44.86 |
| H%   | 4.70       | 4.81  |
| N%   | 13.13      | 12.90 |

The IR spectrum of the resulting compound presents an absorption band at $1250^{cm-1}$, which is characteristic of the N-oxide group.

Other N-oxypyridyl-2 derivatives falling within the scope of the general formula and definition given hereinbefore are also produced in an essentially similar manner. Further such derivatives are produced using, rather than the aqueous medium defined above, an alcoholic medium (100 cm3, H₂O and 100 cm³ of a lower alkanol such as ethanol) or rather than NaOH an organic base such as diethylamine or triethylamine.

Example B

Preparation of zinc chelate of S-(N-oxypyridyl-2) L-cysteine having the formula:

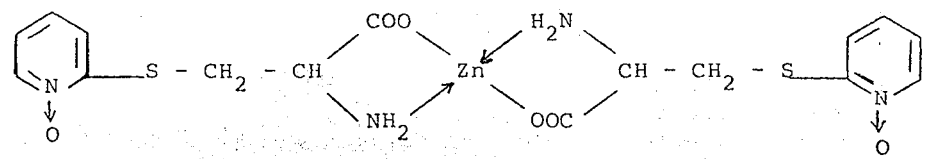

401 cm3 of 10 N NaOH are poured into an aqueous solution of 217g of bromo-2 pyridine N-oxide hydrochloride and 175.5 g of monohydrated L-cysteine hydrochloride containing 700 cm3 of water. The temperature of the mixture rises to 55°C during the addition of the NaOH and the reaction mixture is maintained at this temperature until the thiol groups disappear. The reaction mixture is then filtered, if necessary, and the pH is adjusted to 10.

Thereafter, there is added a solution of 110 g of dehydrated zinc acetate in 400 cm3 of water. A precipitate is immediately formed, which is then filtered, washed in ethanol and ether, filtered and dried under vacuum of $P_2O_5$.

264 g of zinc chelate of S-(N-oxypyridyl-2) L-cysteine are obtained, which is a white compound having a melting point of 245°C, with decomposition.

Analysis reveals that this chelate crystallizes with 4 to 5 molecules of water.

|        |      | NH₂ (meg/g) | Zn%   |
|--------|------|-------------|-------|
| Theory | H₂O  | 3.54        | 11.6  |
|        | H₂O  | 3.44        | 12.2  |
| Found  |      | 3.48        | 11.55 |

The molecular weight of the chelate, crystallized with 4 molecules of water, is 564; the molecular weight of the chelate, crystallized with 5 molecules of water, is 582.

According to the same procedure, the following chelates were prepared:

Cadmium chelate of S-(N-oxypyridyl-2) L-cysteine (from S-(N-oxypyridyl-2) L-cysteine and trihydrated cadmium acetate) white powder crystallized with two molecules of water

| Theory % Cd | 19.60 |
| Found %     | 19.65 |

Manganese chelate of S-(N-oxypyridyl-2) L-cysteine (from S-(N-oxypyridyl-2) L-cysteine and manganese sulfate monohydrated) quantitative yield

| Theory % Mn | 10.25 |
| Found %     | 10.1  |

Iron chelate of S-(N-oxypyridyl-2) L-cysteine (from S-(N-oxypyridyl-2) L-cysteine and ferrous sulfate heptahydrated) quantitative yield in iron chelate dihydrated

| Theory % NH₂ (meg/g) | 3.86 |
| Found %              | 3.85 |

Example C

Preparation of the dihydrochloride of the methyl ester of S-(N-oxypyridyl-2) L-cysteine having the formula:

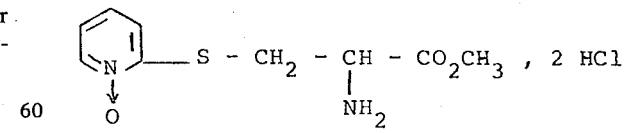

A solution of 1.5 mole of chloro-2pyridine N-oxide and 1 mole of monohydrated L-cysteine hydrochloride in 500 cm3 of water is heated at 50°C while stirring under nitrogen atmosphere. The reaction mixture is maintained at a pH comprised between 8 and 9 by adding a diluted alcaline solution until the thiol groups disappear.

After colling the pH is adjusted to 7 by an acidic solution and the precipitate, eventually formed, filtered. The pH is then adjusted to 5.5 and the solvent is evaporated to dryness under vacuum. The solid residue is crystallized with $CHCl_3$, filtered and dried.

The dried product is then treated with boiling methanol saturated with hydrochloric acid during 2 to 3 hours.

The mineral salts are filtered and by cooling it is obtained white crystals having a melting point of 200°C weight yield = 75–90 %.

According to the same procedure, but replacing methanol by ethanol, propanol, isopropanol or butanol, corresponding ethyl, propyl, isopropyl and butyl esters are produced.

The melting points of these esters are as follows:
ethyl ester of S-(N-oxypyridyl-2) L-cysteine, 2 HCl
F 32 190°C
propyl ester of S-(N-oxypyridyl-2) L-cysteine, 2 HCl
F = 115°C
isopropyl ester of S-(N-oxypyridyl-2) L-cysteine, 2 HCl
F = 135°C
butyl ester of S-(N-oxypyridyl-2) L-cysteine, 2 HCl
F = 100°C

EXAMPLE D

Preparation of the salicylate of the ethyl ester of S-(N-oxypyridyl-2) L-cysteine having the formula:

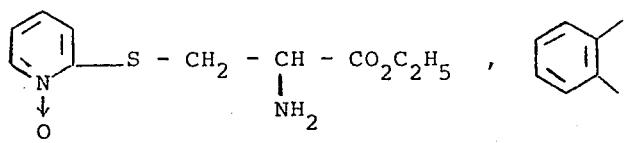

Into a solution of 15.75 g of dihydrochloride of the ethyl ester of S-(N-oxypyridyl-2) L-cysteine in 100 cm3 of ethanol previously cooled at −10°C there are poured a cooled solution of 2.3 g of sodium in 100 cm3 of ethanol. The sodium chloride is filtered and to the remaining solution 13.8 g of salicylic acid are added. After one night −10°C, the precipitate formed is filtered. There is obtained with a weight yeild of 80 % a product melting at 90°C.

Analysis : Theory % N 7.36; S 8.43; Found % 7.09; 8.68.

In a similar procedure the tartarate is obtained by replacing salicylic acid by tartaric acid. After crystallization, in a mixture of ethanol/ethylacetate, it is obtained a white product melting at 148°C.

Analysis : Theory % N 6.83; S 7.81; Found % 7.14; 8.18.

In a manner essentially the same as that set forth in Examples A, B, C and D, except for the initial cysteine reactant which is replaced with one which yields the desired product, other componds of this invention are also produced. Thus, by employing the principles set forth in Example A, C and D, S-(N-oxypyridyl-2) homocysteine and its lower alkyl ester or salts are produced. Replacing the L-cysteine hydrochloride in Example A for instance with the N-acetyl derivative thereof in comparable amounts and using the same operating principles set forth in Example A produces S-(N-oxypyridyl-2)-N-acetyl L-cysteine. The metal salts and chelates of these compounds are also produced by reacting the same with stoichiometric amounts of a water soluble metal inorganic or organic salt such as the acetate, carbonate or sulfate thereof. Thus such salts as the zinc, iron manganese, tin, cadmium, titanium aluminum, molybdenum, sodium, potassium, calcium, barium and lithium salts are also prepared using the operating principles set forth in Examples A and B.

USE OF THE COMPOUNDS OF THIS INVENTION

EXAMPLE 1

A liquid soap is made by producing the following mixture:

| | |
|---|---|
| Sodium lauryl sulfate oxyethylenated with 2 moles of ethylene oxide | 40 g |
| Sodium N-acyl sarcosinate having the formula $RCON-CH_2-COONa$ on $CH_3$ wherein R is lauryl | 10 g |
| Isopropyl palmitate | 5 g |
| 20 % sodium chloride | 35 g |
| S-(N-oxypyridyl-2) L-cysteine | 2 g |
| Demineralized water sufficient for | 100 g |

EXAMPLE 2

A dry spray is made according to the invention, by mixing:

| | | |
|---|---|---|
| Cetyl trimethylammonium bromide | 0.1 | g |
| Polyoxyethylene sorbitan monooleate (Tween 80) | 0.4 | g |
| Ethyl alcohol | 5 | g |
| Perfume | 0.1 | g |
| S-(N-oxypyridyl-2) homocysteine, in 20 % aqueous solution | 1 | g |
| Freon 12 (dichlorodifluoromethane) sufficient for | 100 | g |

EXAMPLE 3

A deodorant talcum powder is made according to the invention by mixing:

| | | |
|---|---|---|
| Talcum powder | 99 | g |
| Glycerin oleate | 3 | g |
| Isopropyl myristate | 7 | g |
| S-(N-oxypyridyl-2) L-cysteine | 3 | g |
| Perfume | 2 | cm³ |

This talcum powder based composition is also prepared in the form of a pressurized aerosol spray by admixing under pressure 10 g of the above preparation with 45 g of a liquefied fluorochlorinated hydrocarbon, known as Freon 11 (trichloromonofluoromethane) and 45 g of a liquefied fluorochorinated hydrocarbon known as Freon 12 (dichlorodifluoromethane).

EXAMPLE 4

A deodorant stick having the following composition is made according to the invention:

| | | |
|---|---|---|
| Sodium stearate | 5 | g |
| Propylene glycol | 60 | g |
| Glycerin | 5 | g |
| S-(N-oxypridyl-2) L-cysteine | 2 | g |
| Perfume | 0.5 | g |
| Water sufficient for | 100 | g |

EXAMPLE 5

Still another deodorant stick having the following composition is made according to the invention:

| | | |
|---|---|---|
| Sodium stearate | 5 | g |
| Propylene glycol | 21 | g |
| Glycerin | 12 | g |
| Ethyl alcohol | 32 | g |
| Water | 27.5 | g |
| Perfume | 0.5 | g |
| S-(N-oxypyridyl-2) homocysteine | 2 | g |

The pH of this composition is adjusted to 7 with steric acid.

EXAMPLE 6

A deodorant milk having the following composition is made according to the invention:

| | | |
|---|---|---|
| A mixture of polyoxyethylene alcohols containing 16 to 18 carbon atoms and known as "Cire de Sipol A.O." | 2.5 | g |
| Wheat starch | 2 | g |
| G.4 (2-2'-dihydroxy-5-5' dichlorodiphenyl methane) | 0.1 | g |
| S-(N-oxypyridyl-2) L-cysteine | 2 | g |
| Ethylenediaminetetraacetic acid, sodium salt | 0.1 | g |
| Methyl parahydroxybenzoate | 0.1 | g |
| Silicone oil known commercially as "Rhodorsil 47 V 300" | 0.2 | g |
| Water sufficient for | 100 | g |

EXAMPLE 7

A deodorant cream having the following composition is made according to the invention:

| | | |
|---|---|---|
| Nonionic self-emulsifiable fatty alcohol complexes known commercially as "Lambritol Wax 21" | 21 | g |
| Isopropyl myristate | 3 | g |
| Silicone oil known as "Rhodorsil 47 V 300" | 0.5 | g |
| Propylene glycol | 2 | g |
| Propyl parahydroxybenzoate | 0.2 | g |
| Salicylate of the ethyl ester of S-(N-oxypyridyl-2) L-cysteine | 2 | g |
| Perfume | 1 | g |
| Water sufficient for | 100 | g |

EXAMPLE 8

A deodorant toilet water according to the invention is prepared by making the following mixture:

| | | |
|---|---|---|
| S-(N-oxypyridyl-2) L-cysteine | 2 | g |
| Perfume | 1 | g |
| Absolute ethyl alcohol | 50 | cm³ |
| Water sufficient for | 100 | cm³ |

EXAMPLE 9

A capillary lotion according to the invention is prepared by dissolving in 100 cm³ of perfumed distilled water, 1.5 g of S-(N-oxypyridyl-2) L-cysteine.

EXAMPLE 10

A men's hair dressing lotion is prepared by mixing:

| | | |
|---|---|---|
| Dihydrochloride of propylester of S-(N-oxypyridyl-2) L-cysteine | 0.75 | g |
| Dimethylhydantoin formol resin | 0.5 | g |
| Dimethyl dilaurylammonium chloride | 0.5 | g |
| Perfume | 0.1 | g |
| Ethyl alcohol | 50 | cc |
| Water sufficient for | 100 | cc |

EXAMPLE 11

A capillary composition according to the invention is prepared by mixing:

| | | |
|---|---|---|
| S-(N-oxypyridyl-2) L-cysteine | 1.5 | g |
| Perfumed distilled water | 100 | cc | to which are added:

| | |
|---|---|
| Reticulated polyacrylic acid known under the trademark "Carbopol 940" | 1.25 g |

To the resulting mixture there is added sufficient ammonia to obtain a pH between 8.0 and 8.2. This mixture is in the form of a gel.

EXAMPLE 12

A capillary lotion made in accordance with this invention is prepared by dissolving 3 g of S-(N-oxypyridyl-2) L-cysteine in 100 cm³ of 50% ethanol or isopropanol solution.

EXAMPLE 13

A liquid shampoo according to the invention is prepared by mixing the following compounds:

| | | |
|---|---|---|
| Sodium lauryl sulfate oxyethylenated with 2.2 moles of ethylene oxide | 9 | g |
| Sodium monolauryl sulfosuccinate | 1 | g |
| Polyethylene glycol distearate | 2 | g |
| Lauric diethanolamide | 2 | g |
| Cadmium chelate of S-(N-oxypyridyl-2) L-cysteine | 0.3 | g |
| Perfume | 0.3 | g |
| Lactic acid sufficient for pH of 6.5 | | |
| Water sufficient for | 100 | g |

EXAMPLE 14

A cream shampoo according to the invention is made by mixing the following compounds:

| | | |
|---|---|---|
| Sodium lauryl sulfate | 10 | g |
| Product of condensation of copra fatty acids on methyltaurine (a paste sold under the tradename "Hostapon C.T." by the Hoechst Company and having the formula: R—CON—CH$_2$—CH$_2$—SO$_3$Na, $\quad\quad\quad$ \| $\quad\quad\quad$ CH$_3$ wherein R represents the copra radical C$_5$ to C$_{17}$ | 45 | g |
| Lauryl monoethanolamide | 2 | g |
| Glycerol monostearate | 4 | g |
| Butylester of S-(N-oxypyridyl-2) L-cysteine, 2 HCl | 2 | g |
| Lactic acid sufficient for pH of 6.6 | | |
| Perfume | 0.2 | g |
| Water sufficient for | 100 | g |

EXAMPLE 15

A shampoo powder made in accordance with the present invention is prepared by mixing:

| | |
|---|---|
| Sodium lauryl sulfate | 40 g |
| The product of condensation of copra fatty acids on sodium isethionate (sold under the tradename "Hostapon K.A." by the Hoechst company and having the formula: R COO—CH$_2$—CH$_2$SO$_3$Na, wherein R represents the copra radical C$_5$ to C$_{17}$) | 31 g |
| S-(N-oxypyridyl-2) L-cysteine | 28 g |
| Perfume | 1 g |

At the time of use, the powder is dissolved in 10 times its weight of water, the solution then being applied to the head.

EXAMPLE 16

A dye shampoo made in accordance with this invention is prepared by mixing:

| | | |
|---|---|---|
| Iron chelate of S-(N-oxypyridyl-2) L-cysteine | 5 | g |
| Ammonium lauryl sulfate oxyethylenated with 2 moles of ethylene oxide | 250 | g |
| Paratoluylenediamine | 10 | g |
| Metadiamino anisol sulfate | 0.5 | g |
| Resorcinol | 5 | g |
| Metaaminophenol | 1.5 | g |
| Paraaminophenol | 1 | g |
| Ethylene diamine tetracetic acid | 3 | g |
| 40% sodium bisulfite | 15 | g |
| Water sufficient for | 1000 | g |

This product is mixed with 1000 g of 20 volume hydrogen peroxide and hair containing 80% white hair is impregnated with this composition. A brown coloring is obtained.

EXAMPLE 17

The first step of a permanent wave operation is performed with a composition containing:

| | | |
|---|---|---|
| Ammonium thioglycolate | 9.5 | g |
| Sipol AQ wax (sold by the Sinnova company, is a mixture of 30% cetyl alcohol and 70% stearic alcohol polyoxyethylenated with 33 moles of ethylene oxide) | 0.8 | g |
| Ammonia, solution sufficient for 0.7 N | | |
| Water sufficient for | 100 | g |

With the hair in curlers, the setting is performed with the following composition:

| | | |
|---|---|---|
| Sodium bromate | 18 | g |
| S-(N-oxypyridyl-2) L-cysteine | 0.5 | g |
| Water sufficient for | 100 | g |

After the hair has been rinsed, taken down and then dried, a permanent presenting a good hold is obtained, the hair becoming much less greasy than before.

EXAMPLE 18

The first step of a permanent is performed for oily hair with the two-part composition described below:

| | | |
|---|---|---|
| The first part contains: | | |
| Ammonium thioglycolate | 9.5 | g |
| Monoethanolamine sufficient for 0.65 N solution | | |
| Ammonium lauryl sulfate | 0.5 | g |
| Water sufficient for | 100 | |
| The second part is made up of: | | |
| Isopropyl ester of S-(N-oxypyridyl-2) L-cysteine, 2 HCl | 1 | g |

The second part is dissolved in the solution constituting the first part and the first step of a permanent waving is performed with this composition in a conventional manner.

EXAMPLE 19

A dermal cream is prepared by mixing the following ingredients:

| | | |
|---|---|---|
| Tartarate of the ethyl ester of S-(N-oxypyridyl-2) L-cysteine | 2 | g |
| Titanium oxide | 10 | g |
| Red iron oxide | 0.3 | g |
| Yellow iron oxide | 0.2 | g |
| Brown iron oxide | 0.4 | g |
| Chestnut iron oxide | 0.2 | g |
| Oxyethylene cetyl stearyl alcohol | 7 | g |
| Silicone oil | 1 | g |
| Polyglycol stearate | 6 | g |
| Propyl parahydroxybenzoate | 0.20 | g |
| Water sufficient for | 100 | g |

EXAMPLE 20

A dermal aerosol foam is prepared by mixing in an aerosol bomb the following ingredients:

| | | |
|---|---|---|
| Reticulated polyacrylic acid sold under the trademark "Carbopol 934" | 25 | g |
| Magnesium ethoxylauryl sulfate | 8 | g |
| Glycerin | 10 | g |
| Ammonia | 0.2 | g |
| S-(N-oxypyridyl-2) L-cysteine | 2 | g |
| Water sufficient for | 100 | g |

88 g of the solution described above are packaged in an aerosol container with 12 g of difluoro-dichloromethane.

EXAMPLE 21

An anionic liquid shampoo according to the invention is prepared by mixing the following compounds:

| | | |
|---|---|---|
| Technical (100%) oxyethylenated sodium lauryl sulfate | 7 | g |
| Copra diethanolamide | 2 | g |
| "Carbopol 934" (reticulated polyacrylic acid sold by the Goodrich Company) | 0.9 | g |
| Hydroxymethyl cellulose | 0.4 | g |
| Cadmium chelate of S-(N-oxypyridyl-2) L-cysteine | 2 | g |
| Perfume | 0.5 | g |
| Dye (F.D.C. Green No. 3 having the empirical formula $C_{37}H_{34}N_2O_{10}S_3Na_2$) | 0.1 | g |
| Water sufficient for | 100 | g |

This shampoo is a liquid opaque suspension having a pH of 7-7.5. The shampoo is applied twice, with intermediate rinsing, in an amount sufficient to obtain the formation of a foam upon the second application.

EXAMPLE 22

An anionic liquid shampoo according to this invention is prepared by mixing the following compounds:

| | | |
|---|---|---|
| Technical (100%) triethanolamine lauryl sulfate | 9 | g |
| Copra diethanolamide | 4 | g |
| "Veegum F" (highly refined colloidal magnesium-silicate - sold by the Vanderbilt company) | 5 | g |
| Sodium chloride | 3 | g |
| Manganese chelate of S-(n-oxypyridyl-2) L-cysteine | 2 | g |
| Carboxymethyl cellulose | 0.3 | g |
| Perfume | 0.5 | g |
| Dye (F.D.C. Green No. 3 having the empirical formula $C_{37}H_{34}N_2O_{10}S_3Na_2$) | 0.1 | g |
| Water sufficient for | 100 | g |

This shampoo is in the form of an opaque liquid suspension having a pH 7-7.5.

When applied under the conditions of Example 21, it also gives good results in the case of scalp exhibiting dandruff.

EXAMPLE 23

An anionic cream shampoo is made by mixing the following compounds:

| | | |
|---|---|---|
| Technical (100%) sodium lauryl sulfate | 10 | g |
| Copra monoethanolamide | 5 | g |
| Glycerol monostearate | 6 | g |
| Lanolin | 1 | g |
| Zinc chelate of S-(N-oxypyridyl-2) L-cysteine | 2 | g |
| Dye (F.D.C. Green No. 3 having the empirical formula $C_{37}H_{34}N_2O_{10}S_3N_2$) | 0.1 | g |
| Perfume | 0.5 | g |
| Water sufficient for | 100 | g |

EXAMPLE 24

A liquid soap is made by making the following mixture:

| | | |
|---|---|---|
| Sodium lauryl sulfate oxyethylenated with two molecules of ethylene oxide | 40 | g |
| Sodium N-acyl-sarcosinate having the formula: R CO—N—CH$_2$—COO Na<br>         \|<br>         CH$_3$<br>wherein R is lauryl | 10 | g |
| Isopropyl palmitate | 5 | g |
| 20% lactic acid | 4 | g |
| Cadmium chelate of S-(N-oxypyridyl-2) L-cysteine | 0.1 | g |
| Demineralized water sufficient for | 100 | g |

This soap is limpid and clear and has a pH of 6.5.

EXAMPLE 25

A dry spray according to the invention is made by mixing:

| | | |
|---|---|---|
| Cetyl trimethylammonium bromide | 0.1 | g |
| Polyoxyethylene fatty esters of sorbitol or polyoxyethylene sorbitan monooleate (Tween 80) | 0.4 | g |
| Ethyl alcohol | 5 | g |
| Perfume | 0.1 | g |
| Zinc chelate of S-(N-oxypyridyl-2) L-cysteine | 0.1 | g |
| Dichlorodifluoromethane (Freon 12) sufficient for | 100 | g |

Before use of this dry spray, it is necessary to agitate the composition, the zinc chelate being barely soluble.

EXAMPLE 26

A dry spray according to the invention is made by mixing:

| | | |
|---|---|---|
| Propylene glycol | 1 | g |
| Iron chelate of S-(N-oxypyridyl-2) L-cysteine | 0.1 | g |
| Perfume | 0.2 | g |
| Dichlorodifluoromethane (Freon 12) | 100 | g |

As in the preceding example, the composition is agitated before use.

EXAMPLE 27

A deodorant talcum powder in spray form is prepared by mixing:

| | | |
|---|---|---|
| Talcum powder | 85 | g |
| Glycerol oleic esters | 3 | g |
| Isopropyl myristate | 7 | g |
| Zinc chelate of S-(N-oxypyridyl-2) L-cysteine | 3 | g |
| Perfume | 2 | g |
| Propellant: | | |
| Freon 11 (trichloromonofluoromethane) | 45 | g |
| Freon 12 (dichlorodifluoromethane) | 45 | g |

EXAMPLE 28

A solution for sanitary napkins is prepared by mixing:

| | | |
|---|---|---|
| Sodium 1-($\beta$-carboxymethyloxyethyl)-1-(carboxymethyl)-2-(lauryl)-2-(imidazolinium) hydroxide (sold by the Miranol Chemical Co. under the trademark MIRANOL C2M) | 1 | g |
| Cadmium chelate of S-(N-oxypyridyl-2) L-cysteine | 0.1 | g |
| 20% lactic acid | 12 | cc |
| Demineralized water sufficient for | 100 | g |

The solution is limpid and has a pH of 3.

EXAMPLE 29

A deodorant cream according to the invention is prepared by mixing the following material:

| | | |
|---|---|---|
| Self-emulsifying nonionic fatty alcohol complexes (sold under the tradename "Lambritol Wax N 21") | 12 | g |
| Isopropyl myristate | 3 | g |
| Silicone oil (sold under the name "Rhodorsil 47 V 300") | 0.5 | g |
| Propylene glycol | 2 | g |
| Propyl parahydroxybenzoate | 0.2 | g |
| Iron chelate of S-(N-oxypyridyl-2) L-cysteine | 1 | g |
| Perfume | 1 | g |
| Water sufficient for | 100 | g |

EXAMPLE 30

An emulsified dilute alcohol (ethanol or isopropanol) deodorant spray according to the invention is made by making the following mixture and packaging the same under pressure in an aerosol container:

| | | |
|---|---|---|
| Sorbitan trioleate | 0.4 | g |
| Polyoxyethylene sorbitan monooleate (Tween 80) | 0.1 | g |
| Manganese chelate of S-(N-oxypyridyl-2) L-cysteine | 2 | g |
| Perfume | 0.8 | g |
| Absolute ethyl alcohol | 22 | g |
| Water | 34.7 | g |
| Dichlorodifluoromethane | 40 | g |

EXAMPLE 31

A deodorant toilet water according to the invention is prepared by making the following mixture:

| | | |
|---|---|---|
| Zinc chelate of S-(N-oxypyridyl-2) L-cysteine | 0.5 | g |
| Perfume | 1 | g |
| Absolute ethyl alcohol | 50 | cm$^3$ |
| Water sufficient for | 100 | cm$^3$ |

EXAMPLE 32

A men's hair dressing lotion is prepared by mixing:

| | | |
|---|---|---|
| Zinc chelate of S-(N-oxypyridyl-2) L-cysteine | 0.75 | g |
| Dimethylhydantoin formaldehyde resin (water-soluble, softens at 59–80°C) | 0.5 | g |
| Dimethyl dilaurylammonium chloride | 0.5 | g |
| Perfume | 0.1 | g |
| Ethanol | 50 | cc |
| Water sufficient for | 100 | cc |

This lotion is agitated before use.

EXAMPLE 33

A fluid hair dressing gel is prepared by mixing:

| | | |
|---|---|---|
| Zinc chelate of S-(N-oxypyridyl-2) L-cysteine | 0.5 | g |
| Reticulated polyacrylic acid (sold under the trademark "Carbopol 940") | 0.45 | g |
| Polyvinylpyrrolidone (MW = 40,000) | 2 | g |
| Oxyethylenated lanolin | 1 | g |
| Polyethylene glycol 300 | 5 | g |
| Methyl parahydroxybenzoate based preservative (sold under the trademark "Nipagine") | 0.1 | g |
| Propyl parahydroxybenzoate based preservative (sold under the trademark "Nipasol") | 0.1 | g |
| Perfume | 0.1 | g |
| Triethanolamine sufficient for pH 8 | | |
| Water sufficient for | 100 | cc |

EXAMPLE 34

A hair setting dye lotion for application to white hair presenting a greasy appearance is prepared by mixing together:

| | | |
|---|---|---|
| Polyvinylpyrrolidone (MW = 40,000) | 0.4 | g |
| Vinyl acetate/crotonic acid copolymer, 90%/10% having a molecular weight of 20,000 and sold by National Starch under the trade name RESYN 28.1310) | 0.2 | g |
| Isopropyl alcohol sufficient for 50° titer | | |
| Manganese chelate of S-(N-oxypyridyl-2) L-cysteine | 0.7 | g |
| Aminopropylamino-1 anthraquinone | 0.03 | g |
| Picramic acid | 0.017 | g |
| N-γ-amino propylamino-4-N'-methyl-amino-1-anthraquinone | 0.04 | g |
| Water sufficient for | 100 | g |

The pH of the mixture is adjusted to a value of 7 by the addition thereto of triethanolamine.

A good hair-setting lotion is obtained, which, when applied to white hair, makes it possible to give it a smoky gray glint, while essentially eliminating the initial greasy appearance thereof.

EXAMPLE 35

The first step of a conventional permanent wave technique is performed with a reducing composition containing:

| | | |
|---|---|---|
| Ammonium thioglycolate | 9.5 | g |
| Sipol AO wax (sold by the Sinnova company) | 0.8 | g |
| Ammonia, solution sufficient for 0.7 N | | |
| Water sufficient for | 100 | g |

Thereafter, the second step of the permanent wave technique is conducted using a neutralizing composition, packaged in two parts which comprises as the first part or package:

| | | |
|---|---|---|
| Hydrogen peroxide sufficient for | 6.6 | vol. |
| Citric acid | 0.1 | g |
| Water sufficient for | 100 | cc | and as the second part or package a powder made up of:

| | |
|---|---|
| Zinc chelate S-(N-oxypyridyl-2) L-cysteine | 5 g |

The powder making up the second part or package is put in suspension in the hydrogen peroxide solution and the hair previously treated with the reducing composition described above and put up on curlers, is set with the said neutralizing solution.

After the hair has been rinsed and taken down and then dried, a permanent wave presenting a good hold is obtained, the hair becoming much less greasy than before.

EXAMPLE 36

A dermal foaming gel is prepared by mixing the following ingredients: 8n

| | | |
|---|---|---|
| Reticulated polyacrylic acid (sold under the trademark "Carbopol 934") | 25 | g |
| Magnesium ethoxylauryl sulfate | 8 | g |
| Glycerin | 10 | g |
| Ammonia | 0.2 | g |
| Zinc chelate of S-(N-oxypyridyl-2) L-cysteine | 2 | g |
| Water sufficient for | 100 | g |

EXAMPLE 37

A dermatological cake is prepared by mixing the following ingredients:

| | |
|---|---|
| Esters of sodium isethionate and copra fatty acids (sold under the trade mark "IGEPON A" having the formula R—COO—CH$_2$—CH$_2$—SO$_3$—Na, wherein R = fatty acid derivative having from 12 to 18 carbon atoms) | 75 g |
| Lanolin derivatives (sold by CRODA under the trademark "SUPER HARTOLAN" and lecithin | 23 g |
| Zinc chelate of S-(N-oxypyridyl-2) L-cysteine | 2 g |

EXAMPLE 38

A shampoo powder according to the invention is made by mixing the following ingredients:

| | |
|---|---|
| Sodium lauryl sulfate powder with 90% active material | 35 g |
| Lithium lauryl sulfate powder with 90% material | 35 g |
| Sodium sulfate | 10 g |
| The dihydrochloride of the methyl ester of S-(N-oxypyridyl-2) L-cysteine | 20 g |

At the time of use, the above mixture is dissolved in about 10 times its weight of water and the resulting solution is then applied to the head.

EXAMPLE 39

A shampoo powder according to the invention is made by mixing the following ingredients:

| | |
|---|---|
| Sodium lauryl sulfate powder with 90% active material | 32 g |
| Condensation product of copra fatty acids with sodium isethionate (sold under the name of "HOSTAPON K.A." by the Hoechst company) | 45 g |
| Sodium sulfate | 5 g |
| Manganese chelate of S-(N-oxypyridyl-2) L-cysteine | 18 g |

At the time of use, the above mixture is dissolved in 5 times its weight of water and applied to the hair.

EXAMPLE 40

A shampoo powder according to the invention is made by mixing the following ingredients:

| | |
|---|---|
| Sodium lauryl sulfate powder with 90 % active material | 35 g |
| Lithium lauryl sulfate powder with 90 % active material | 35 g |
| Sodium sulfate | 10 g |
| S-(N-oxypyridyl-2)-N-acetyl L-cysteine | 20 g |

At the time of use, the above mixture is dissolved in about 10 times its weight of water. The resulting solution is then applied to the head.

EXAMPLE 41

A shampoo powder according to the invention is made by mixing the following ingredients:

| | |
|---|---|
| Sodium lauryl sulfate powder with 90 % active material | 40 g |
| Lithium lauryl sulfate powder with 90 % active material | 40 g |
| Sodium sulfate | 10 g |
| Zinc chelate of S-(N-oxypyridyl-2) homocysteine | 10 g |

At the time of use, the above mixture is dissolved in about 10 times its weight of water. The resulting solution is then applied to the head.

EXAMPLE 42

A shampoo powder according to the invention is made by mixing the following ingredients:

| | |
|---|---|
| Sodium lauryl sulfate powder with 90% active material | 32 g |
| Condensation product of copra fatty acids with sodium isethionate (sold under the name of "HOSTAPON K.A." by the Hoechst company) | 45 g |
| Sodium sulfate | 5 g |
| The dihydrochloride of the methyl ester of S-(N-oxypyridyl-2) homocysteine. | 18 g |

At the time of use, the above mixture is dissolved in 5 times its weight of water and then applied to the hair.

EXAMPLE 43

A shampoo powder according to the invention is made by mixing the following ingredients:

| | |
|---|---|
| Sodium lauryl sulfate powder with 90% active material | 30 g |
| Condensation product of copra fatty acids with sodium isethionate (sold under the name of "HOSTAPON K.A." by the Hoechst company) | 41 g |
| Sodium sulfate | 10 g |
| Cadmium chelate of S-(N-oxypyridyl-2) L-cysteine | 19 g |

At the time of use, the above mixture is dissolved in 5 to 10 times its weight of water and applied to the hair.

EXAMPLE 44

A shampoo powder is made according to the invention by mixing the following ingredients:

| | |
|---|---|
| Sodium lauryl sulfate powder with 90% active material | 40 g |
| Lithium lauryl sulfate powder with 90% active material | 40 g |
| Sodium sulfate | 15 g |
| Iron chelate of S-(N-oxypyridyl-2) L-cysteine | 5 g |

At the moment of use, the above mixture is dissolved in about 10 times its weight of water, the solution then being applied to the head.

What is claimed is:

1. A composition having fungicidal, bactericidal and antidandruff characteristics for application to the hair, scalp or skin in order to combat the greasy and unaesthetic appearance of the hair and scalp and to counteract the formation of body odours, said composition comprising a solution in a carrier selected from the group consisting of water, a lower alkanol selected from the group consisting of ethanol and isopropanol and an aqueous solution of said lower alkanol wherein said lower alkanol is present in amounts of about 20-70 percent by weight of said solution, of an active component selected from the group consisting of a. a compound of the formula

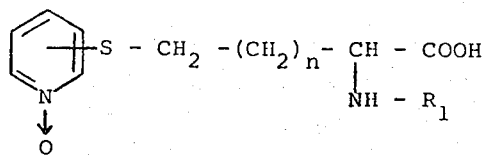

wherein $n$ is equal to 0 or 1, the sulfur atom being attached to the N-oxypyridyl nucleus in a position ortho or para to the NO group, and $R_1$ represents a member selected from the group consisting of hydrogen, $COR_2$ and $SO_2R_2$ wherein $R_2$ is selected from the group consisting of alkyl having 1-4 carbon atoms, phenyl and tolyl;

b. the metal complex of the compound in (a) when $R_1$ is hydrogen, said metal being zinc, iron, cadmium or manganese, and c. the metal salt of the compound in (a) when $R_1$ is selected from the group consisting of $COR_2$ and $SO_2R_2$, said metal being zinc, iron, manganese, tin, cadmium, titanium, aluminium, molybdenum, sodium, potassium, calcium, barium or lithium, said active component being present in amounts of about 0.01–10 percent by weight of said composition.

2. A composition having fungicidal, bactericidal and antidandruff characteristics for application to the hair, scalp or skin in order to combat the greasy and unaesthetic appearance of the hair and scalp and to counteract the formation of body odours said composition comprising a solution in a carrier selected from the group consisting of water, a lower alkanol selected from the group consisting of ethanol and isopropanol and an aqueous solution of said lower alkanol wherein said lower alkanol is present in amounts of about 20-70 percent by weight of said solution, of an active component having the formula

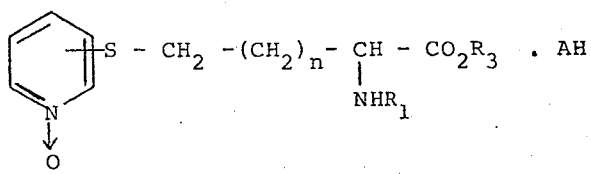

wherein $n$ is equal to 0 or 1, $R_1$ is selected from the group consisting of hydrogen, $COR_2$ and $SO_2R_2$ wherein $R_2$ is selected from the group consisting of alkyl having 1-4 carbon atoms, phenyl and tolyl, $R_3$ is alkyl having 1-4 carbon atoms and AH is an acid selected from the group consisting of hydrochloric acid, salicylic acid, malic acid, tartaric acid and maleic acid, said active component being present in amounts of about 0.01-10 percent by weight of said composition.

3. A pressurized sprayable aerosol composition having fungicidal, bactericidal and antidandruff characteristics for application to the hair, scalp or skin in order to combat the greasy and unaesthetic appearance of the hair and scalp and to counteract the formation of body odours, said composition comprising in admixture with a member selected from the group consisting of a lower alkanol, water, a cosmetic powder and propylene glycol, an active component selected from the group consisting of a. a compound of the formula

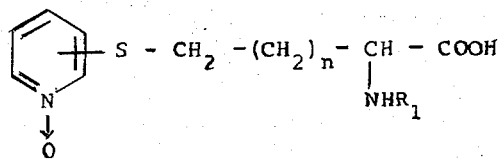

wherein $n$ is equal to 0 or 1, the sulfur atom being attached to the N-oxypyridyl nucleus in a position ortho or para to the NO group, and $R_1$ represents a member selected from the group consisting of hydrogen, $COR_2$ and $SO_2R_2$ wherein $R_2$ is selected from the group consisting of alkyl having 1-4 carbon atoms, phenyl and tolyl;

b. the metal complex of the compound in (a) when $R_1$ is hydrogen, said metal being zinc, iron, cadmium or manganese; and c. the metal salt of the compound in (a) when $R_1$ is selected from the group consisting of $COR_2$ and $SO_2R_2$, said metal being zinc, iron, manganese, tin, cadmium, titanium, aluminium, molybdenum, sodium, potassium, calcium, barium or lithium, said active component being present in amounts of about 0.01–10 percent by weight of said admixture, and a halogenated hydrocarbon aerosol propellant present in amounts of about 2–3 times the weight of said admixture.

4. A composition having fungicidal, bactericidal and antidandruff characteristics for application to the hair, scalp or skin in order to combat the greasy and unaesthetic appearance of the hair and scalp and to counteract the formation of body odours, said composition comprising a solution in a solvent selected from the group consisting of water, ethanol, isopropanol and their mixtures of 0.01–10 percent by weight of an active component selected from the group consisting of
  a. a compound of the formula

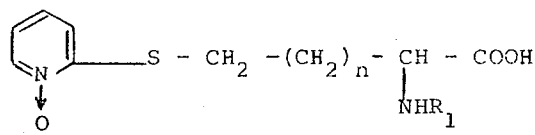

wherein $n$ is equal to 0 or 1, and $R_1$ is selected from the group consisting of hydrogen and $-COR_2$ wherein $R_2$ is alkyl having 1–4 carbon atoms,
  b. a compound of the formula

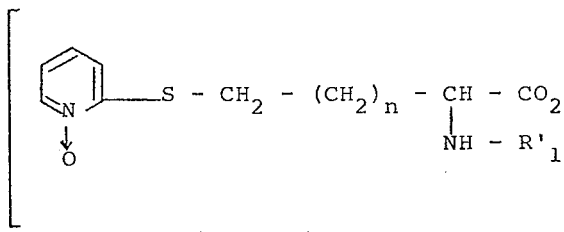

wherein $n$ is equal to 0 or 1, $R'_1$ is selected from the group consisting of $-COR'_2$ and $-SO_2R''_2$ wherein $R'_2$ is selected from the group consisting of alkyl having 1–4 carbon atoms and phenyl, and $R''_2$ is selected from the group consisting of alkyl having 1–4 carbon atoms, phenyl and tolyl, and M is selected from the group consisting of iron and zinc, and

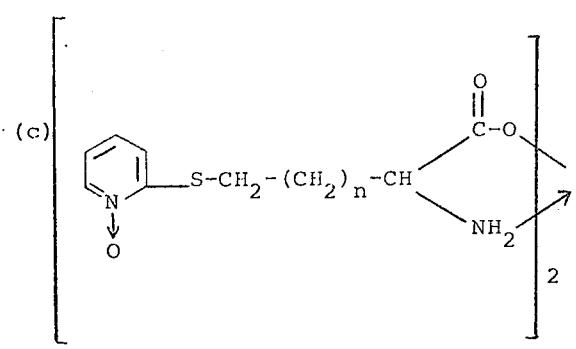

wherein $n$ is equal to 0 or 1 and $M^1$ is selected from the group consisting of zinc, iron, cadmium and manganese.

5. A composition having fungicidal, bactericidal and antidandruff characteristics for application to the hair, scalp or skin in order to combat the greasy and unaesthetic appearance of the hair and scalp and to counteract the formation of body odours, said composition comprising a solution in a solvent selected from the group consisting of water, ethanol, isopropanol and their mixtures of 0.01–10 percent by weight of an active component of the formula

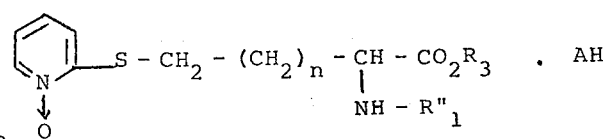

wherein $n$ is equal to 0 or 1, $R_3$ is alkyl having 1–4 carbon atoms and $R''_1$ is selected from the group consisting of hydrogen and $-COR_2$ wherein $R_2$ is alkyl having 1–4 carbon atoms, and AH is an acid selected from the group consisting of hydrochloric acid, salicylic acid, malic acid, tartaric acid and maleic acid.

6. A pressurized sprayable aerosol composition having fungicidal, bactericidal and antidandruff characteristics for application to the hair, scalp and skin in order to combat the greasy and unaesthetic appearance of the hair and scalp and to counteract the formation of body odours, said composition comprising in admixture with a member selected from the group consisting of water, ethanol, isopropanol, talcum powder and propylene glycol, 0.01–10 percent by weight of an active component selected from the group consisting of:
  a. a compound of the formula

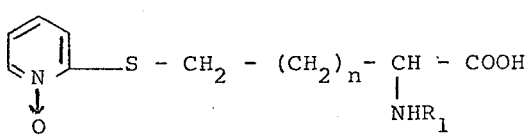

wherein $n$ is equal to 0 or 1 and $R_1$ is selected from the group consisting of hydrogen and $-COR_2$ wherein $R_2$ is alkyl having 1–4 carbon atoms,
  b. a compound of the formula

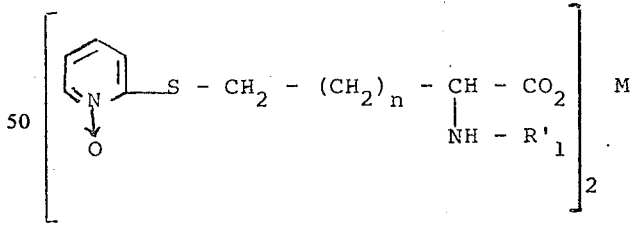

wherein $n$ is equal to 0 or 1, $R'_1$ is selected from the group consisting of $-COR'_2$ and $-SO_2R''_2$ wherein $R'_2$ is selected from the group consisting of alkyl having 1–4 carbon atoms and phenyl, and $R''_2$ is selected from the group consisting of alkyl having 1–4 carbon atoms, phenyl and tolyl, and M is selected from the group consisting of iron and zinc, and
  c. a compound of the formula

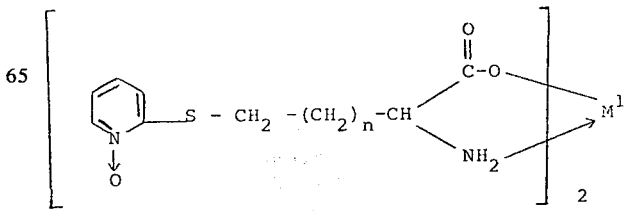

wherein $n$ is equal to 0 or 1, and $M^1$ is selected from the group consisting of zinc, iron, cadmium and manganese, together with a propellant selected from the group consisting of dichlorodifluoromethane, trichlorofluoromethane and their mixtures, said propellant being present in amounts from about 2–3 times the weight of said admixture.

7. A pressurized sprayable aerosol composition having fungicidal, bactericidal and antidandruff characteristics for application to the hair, scalp and skin in order to combat the greasy and unaesthetic appearance of the hair and scalp and to counteract the formation of body odours, said composition comprising in admixture with a member selected from the group consisting of water, ethanol, isopropanol, talcum powder and propylene glycol, 0.01–10 percent by weight of an active component of the formula:

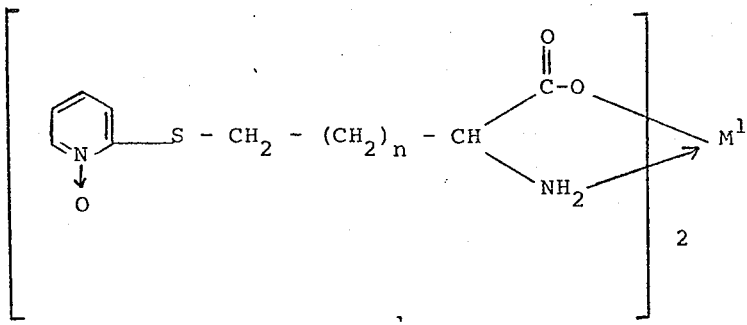

wherein $n$ is equal to 0 or 1, $R_3$ is alkyl having 1–4 carbon atoms and $R''_1$ is selected from the group consisting of hydrogen and $-COR_2$ wherein $R_2$ is alkyl having 1–4 carbon atoms and AH is an acid selected from the group consisting of hydrochloric acid, salicylic acid, malic acid, tartaric acid and maleic acid, together with a propellant selected from the group consisting of dichlorodifluoromethane, trichlorofluoromethane and their mixtures, said propellant being present in amounts from about 2–3 times the weight of said admixture.

8. A powder shampoo composition having fungicidal, bactericidal and antidandruff characteristics for application to the hair and scalp of a person having hair and a scalp characterized by a greasy and unaesthetic appearance due to excessive secretion of the sebaceous glands, so as to improve the condition and appearance thereof by diminishing said excessive secretion of the sebaceous glands, said composition comprising in admixture 65 to 90 percent by weight of a detergent selected from the group consisting of anionic, cationic, non-ionic and amphoteric detergent, and 5 to 30 percent by weight of an active component selected from the group consisting of a. a compound of the formula

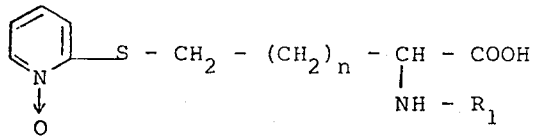

wherein $n$ is equal to 0 or 1 and $R_1$ is selected from the group consisting of hydrogen and $-COR_2$ wherein $R_2$ is alkyl having 1–4 carbon atoms, b. a compound of the formula

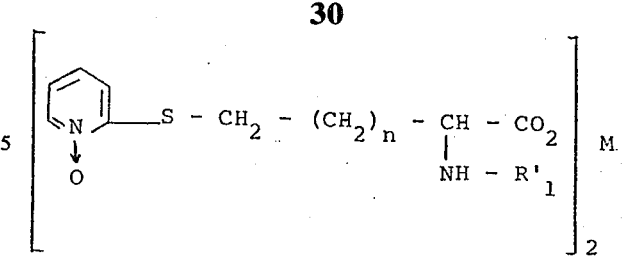

wherein $n$ is equal to 0 or 1, $R'_1$ is selected from the group consisting of $-COR'_2$ and $-SO_2R''_2$ wherein $R'_2$ is selected from the group consisting of alkyl having 1–4 carbon atoms and phenyl, and $R''_2$ is selected from the group consisting of alkyl having 1–4 carbon atoms, phenyl and tolyl, and M is selected from the group consisting of iron and zinc, and c. a compound of the formula

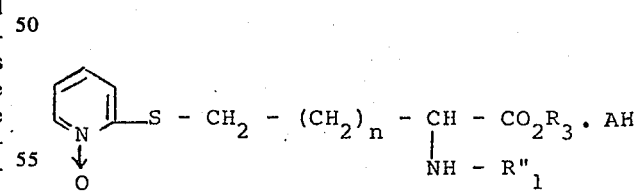

wherein $n$ is equal to 0 or 1, and $M^1$ is selected from the group consisting of zinc, iron, cadmium and manganese.

9. A powder shampoo composition having fungicidal, bactericidal and antidandruff characteristics for application to the hair and scalp of a person having hair and a scalp characterized by a greasy and unaesthetic appearance due to excessive secretion of the sebaceous glands, so as to improve the condition and appearance thereof by diminishing said excessive secretion of the sebaceous glands, said composition comprising in admixture 65 to 90 percent by weight of a detergent selected from the group consisting of anionic, cationic non-ionic and amphoteric detergent, and 5 to 30 percent by weight of an active component having the formula

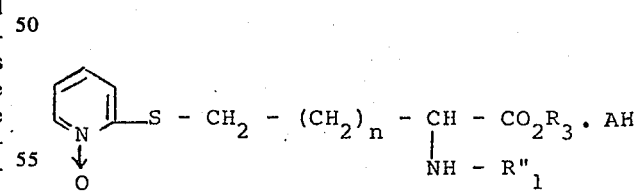

wherein $n$ is equal to 0 or 1, $R_3$ is alkyl having 1–4 carbon atoms and $R''_1$ is selected from the group consisting of hydrogen and $-COR_2$ wherein $R_2$ is alkyl having 1–4 carbon atoms, and AH is an acid selected from the group consisting of hydrochloric acid, salicylic acid, malic acid, tartaric acid and maleic acid.

* * * * *